United States Patent

Basard et al.

[15] 3,665,616
[45] May 30, 1972

[54] SIMULATOR FOR MONOPULSE RADAR HAVING COHERENT DOPPLER FEATURES

[72] Inventors: Robert Basard, Meudon; Pierre E. C. Stoll, Chaville; Pierre H. Sedes, Aristide Briand, all of France

[73] Assignee: International Standard Electric Corporation, New York, N.Y.

[22] Filed: Dec. 10, 1969

[21] Appl. No.: 883,922

[52] U.S. Cl. ............................................. 35/10.4, 343/17.7
[51] Int. Cl. .......................................................... G09b 9/00
[58] Field of Search .................................. 35/10.4; 343/17.7

[56] References Cited

UNITED STATES PATENTS

| | | | |
|---|---|---|---|
| 3,258,770 | 6/1966 | Rapsilber | 343/17.7 |
| 2,811,789 | 11/1957 | Paine | 35/10.4 |
| 3,369,070 | 2/1968 | Nicht | 35/10.4 |
| 3,171,880 | 3/1965 | Feinberg | 35/10.4 |
| 3,540,046 | 11/1970 | Falk | 35/10.4 X |

Primary Examiner—Malcolm F. Hubler
Attorney—C. Cornell Remsen, Jr., Walter J. Baum, Paul W. Hemminger, Charles L. Johnson, Jr. and Thomas E. Kristofferson

[57] ABSTRACT

A device for simulating radar echo "video" signals as would be produced by a monopulse radar system having coherent pulse Doppler features. A low frequency signal is processed by multiple sampling, first by a pulse at the radar PRF which varies in time phase at the azimuth scan rate. Application of the resulting samples to a filter having an impulse response resembling the antenna beam pattern is followed by a controllable sampling to inject the dimensions of simulated echo angle and range. The result is realistic target signals which can be applied directly to a radar indicator for training of operators in the operation of monopulse tracking Doppler radar equipment.

6 Claims, 9 Drawing Figures

SIMULATOR FOR MONOPULSE RADAR HAVING COHERENT DOPPLER FEATURES

BACKGROUND OF THE INVENTION

1. Field of the Invention

This invention relates to radar simulators or trainers. More particularly, the invention relates to a system for generating video signals simulating the appearance and characteristics of a target echo produced by a monopulse radar system having coherent Doppler features.

2. Description of the Prior Art

Radar trainers and simulators per se have been known for many years. The characteristics of each simulator are normally designed to fit the parameters and operational characteristics of a particular equipment. It has been common practice to record, in some manner, data descriptive of an antenna pattern and other characteristics. That data is then programmed into the signal producing process. Such prior art systems have usually been comparatively expensive and relatively inflexible. Extensive use of electromechanical components, servo-mechanisms, etc. is usually involved. Examples of the prior art trainer-simulator equipment are spread throughout the patent literature. U.S. Pat. Nos. 2,889,635; 2,889,636; 2,916,736; and 2,929,157 are examples of such prior art. Systems using parameter recording of antenna pattern data, etc., may use film, magnetic tape, etc., for electromechanical reproduction in combination with any of the aforesaid prior art systems.

For background, it is pointed out that a monopulse radar is adapted to carry out angle-error measurement in a coordinate between a main target and a secondary target. In such a radar, the antenna system includes a reflector or lens illuminated by two primary sources (horns or other feeds) in such a way as to obtain two antenna beams symmetrical with respect to the axis of the reflector or lens aperture centerline and partly overlapping each other. The radar pulse is transmitted simultaneously through the two primary sources and the radiation pattern is then equal to the sum of the two antenna beams due to the primary sources. On reception, the sum and the difference of the signals received by the two sources may be derived through use of a hybrid junction. These sum and difference signals are applied to two reception channels, viz, the sum (S) and the difference (D) channels. The signals of the sum channel are used for measuring the range and also as reference for determination of the sign of the angular error with respect to the axis of the aerial system. The magnitude of the said error is given by the signals of the difference channel. A more detailed description of such systems is contained in "Introduction to Radar Systems," by Merrill I. Skolnik, a McGraw-Hill book (1962).

In a monopulse radar, one may also take advantage of the Doppler effect to detect moving targets in the presence of fixed targets. At the beginning of each repetition period, the phase of the transmitted wave is stored and later compared with the echo wave received. A constant phase angle exists from one repetition period to the following one for waves received after reflection from fixed targets whereas this phase angle varies linearly with respect to time in the case of waves received after reflection from a target moving with a radial velocity greater than zero with respect to the antenna. If the reference signal which, at each repetition period, preserves the memory of the wave transmitted (i.e., is coherent), is applied to a phase detector along with the signal received after reflection from a fixed or moving target, the result is pulses of unchanging amplitude corresponding to fixed targets and for signals received after reflection from moving targets pulses of amplitude which varies sinusoidally at a frequency $f_d$ (generally called Doppler frequency) result. The Doppler component $f_d$ relates to the radial velocity $V$ and to the wavelength $\lambda$ of the system in accordance with: $f_d = -2V/\lambda$.

From the foregoing, the nature of the signals to be simulated will be generally understood, and the logic of the instrumentation of the present invention can be correspondingly appreciated.

SUMMARY OF THE INVENTION

In consideration of the need for simple and less expensive apparatus for the simulation described, the present invention provides a device for simulating the signals produced by a monopulse angular error measuring radar equipment having a coherent pulse Doppler system incorporated therein. To produce the desired result, sinusoidal low frequency signal analogous to a typical Doppler shift is sampled by a pulse train having the PRF of the particular radar and varying in time phase at a rate characteristic of the azimuth scan rotation of the antenna of the system simulated. These samples are applied to a first filter having an impulse response which has the general shape of the antenna beam to be simulated. Second sampling is accomplished on this filter output by pulses at a time phase representative of the azimuth of a hypothetical echo to be simulated. The result of this sampling is applied to a low pass filter having a cut-off of half the second sampling pulse rate. A third sampling by a pulse of simulated radar transmitter duration and at the radar system PRF samples the low-pass filter output at a time phase position corresponding to simulated echo range to produce a corresponding simulated "video" signal. To complete the simulation of characteristic monopulse signals, a duplicate channel is provided beginning at the first filter. Second sampling pulses for this duplicate channel are identical to those of the aforementioned second sampling, except delayed by an amount of time corresponding to the antenna rotation time over the angle between antenna lobes.

The sampled signal outputs of the two channels are finally summed and differenced so that ultimate outputs are simulated sum and difference echo signals. These signals may then be supplied as "video" signals to operating console (radar operator) positions which are identical to the equipment included in fully operational situations, for effective operator training.

Inherent in the above-summarized instrumentation is a unique type of analog multiplication. The concepts involved in that aspect of the detailed structure were previously described in a U.S. patent application, Ser. No. 804,995 filed Mar. 6, 1969, an application assigned to the assignee of this case.

The general object of the invention may be said to be the generation of realistic artificial radar echo signals for the simulation of the sum and difference signals of a monopulse Doppler radar system.

The structural and operational details of the apparatus of the invention will be understood by those skilled in the art as this description proceeds.

DESCRIPTION OF THE PREFERRED EMBODIMENT

As has been stated previously, the output of a phase sensitive detector of a coherent pulse Doppler radar is, for moving targets, a series of pulses the amplitude of which varies sinusoidally at the rate of Doppler frequency $f_d$. However, this pure Doppler frequency can only be obtained for a fixed antenna. In the case of a rotating antenna, each pulse is modulated in amplitude by the antenna beam. It is thus understood that in order to obtain a suitably realistic simulation of these radar signals, it is necessary to reproduce the amplitude (scan) modulation due to antenna polar angle change (rotation).

Figure 1A:
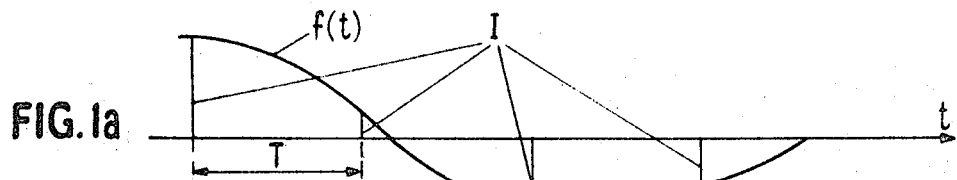
FIGS. 1a, 1b, and 1c represent waveforms of signals pertinent to the operation of the analog multiplier inherent in the apparatus of the invention.

The previous reference to a prior art circuit carrying out an analog multiplication of signals of limited duration and having initial and final amplitudes of which are zero or practically zero will be herein applied to signals $f(t)$ multiplied by $g(t)$. The process set into operation consisted in:

First, sampling the signal $F(t)$ by narrow pulses I of frequency $F = 1/T$ at least equal to twice the maximum frequency of the spectrum $f(t)$, (see FIG. 1a).

Figure 1B:

Second, applying the pulses resulting from this first sampling to a filter, the impulse response of which is $g[(k+1)t]$, the said impulse response having a duration less than T (see FIG. 1b).

Third, sampling the output signal of that filter by narrow pulses II of period $T(1 + 1/K)$ slightly greater in duration than the repetition period T of the first sampling pulses.

Fourth, applying the pulses resulting from this second sampling to a low-pass filter having a cut-off frequency $$\frac{1}{2T\left(1+\frac{1}{K}\right)}.$$

Figure 1C:
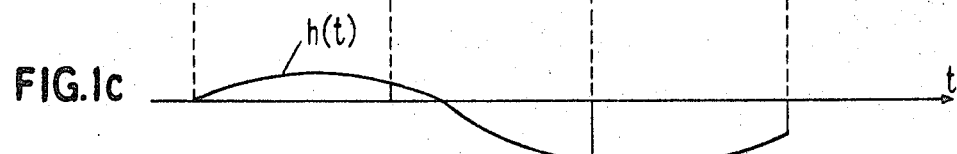

The signal $h(t)$ (FIG. 1c) appearing at the output of the low-pass filter is not exactly the product of $f(t)$ by $g(t)$, its mathematical expression being $h(t) = f(kt/k + 1)$ is approximately equal to $f(t)$. However, since $k$ is great with respect to unity we may consider that $f(kt/k+1)$ is approximately equal to $f(t)$.

It is understood, therefore, that such a multiplier circuit is adapted for simulating the signal coming from a coherent pulse Doppler radar. The beginning signal $f(t)$ consists of a sinusoidally signal at the Doppler frequency $f_d$ or approximately $f_d$ if account is taken of the factor $k/k + 1$. The impulse response $g(t)$ of the filter will be such that it corresponds to the shape of the antenna beam, albeit in accordance with another time scale (in the ratio $k + 1$).

Figure 2:
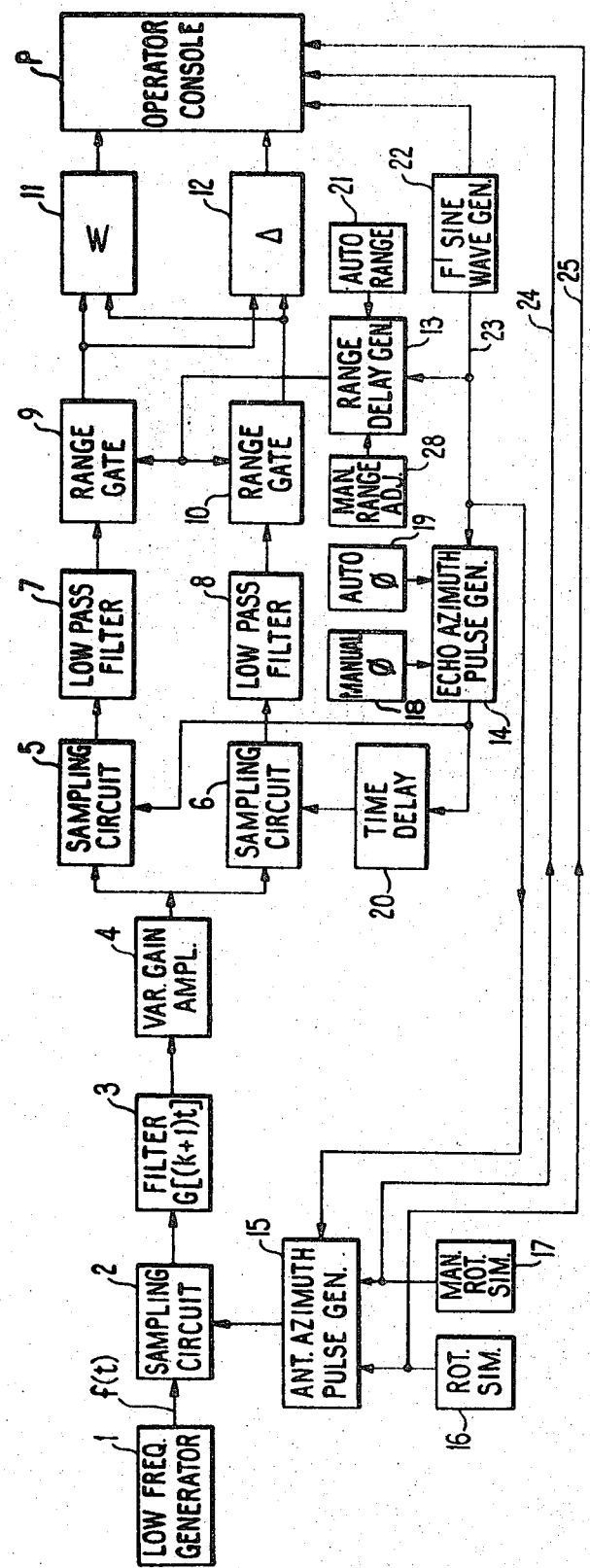
FIG. 2 is a block diagram of the complete apparatus for a system in accordance with the invention.

FIG. 2 presents a system for simulating the desired coherent monopulse Doppler radar signals, the said circuit utilizing the principle of the analog multiplier hereinbefore described. The circuits of FIG. 2 comprise first, a low frequency generator 1 the frequency of which is adjustable and a sampling circuit 2 operative on the low frequency signal. The sampling pulses may be thought of as a "comb" of pulses characterizing the antenna azimuth on a continuous basis, a filter 3 the impulse response of which has the shape of the antenna beam is also included, as is an amplifier with variable gain 4. From 4 the circuit breaks into two identical channels each one corresponding to one of the aforesaid antenna beams. Each of these channels comprising a sampling circuit 5 or 6 by a "-comb" of pulses representing the azimuth of the artificial echo. A low-pass filter 7 or 8 follows each of the said 5 or 6 sampling circuits respectively. Range gates 9 or 10 receiving pulses characterizing the range of the artificial echo follow respectively after the 7 and 8 filters. The duration of the range gate signals is equal to that of the transmitted pulses of the radar which is to be simulated. The output signals of the range gates 9 or 10 are applied to a summer circuit 11 which produces the sum thereof and to a differencing circuit 12 which produces the difference thereof. The output signals then, of the sum and difference circuits 11 and 12 are equivalent to those appearing at the output of the phase sensitive detectors of the sum and difference channels of a monopulse Doppler radar, and are supplied to the operator console P, identical to the actual operating console of the radar system simulated. Such a console would normally include circuits for processing the sum and difference signals and a PPI for visual presentation.

Figure 3:
FIGS. 3a and 3b depict typical series of pulses corresponding to selected bearings.

The series of pulses characterizing the antenna azimuth and the echo azimuth are supplied respectively by circuit 15 and circuit 14. The outputs of these circuits are pulses which, for a given azimuth of the antenna or of the echo respectively, have a repetition period F' equal to that of the pulses of the radar which is to be simulated. Referring now to FIG. 3a, the series of pulses characterizing the azimuth arbitrarily chosen as origin angle is shown. This origin angle may be north, or any other meaningful angle of reference. In FIG. 3b, the F' pulses are represented as they would be for an antenna angle 180° from that shown in FIG. 3a.

These pulses are obtained by phase shifting, using known techniques beginning with a reference sinusoidal wave of frequency F' or lead 23 from circuit 22. The phase angle of said shift is in proportion to the azimuth to be simulated. As two modes of operation of the antenna are foreseen, either continuous rotation during a search mode, or manual angular adjustment during a tracking mode, the circuit 15 is accordingly controlled either by 16 simulating the continuous rotation of the antenna, or by circuit 17 with manual control. This selection would normally be under the control of the student operator. The signals supplied by the circuits 16 and 17 are also applied to the sweep circuits of the PPI of the Console P on leads 24 and 25, the console receiving also the reference signal from 22. The circuits 16 and 17 could be typical sine potentiometers continuously driven in the case of 16 and manually adjusted at 17.

As far as the circuit 14 is concerned, the phase angle which it supplies is variable either manually through circuit 18, or automatically according to a program recorded in the circuit 19. These two controls are under the surveillance of the instructor in a typical simulator according to the present invention. Conventional phase control techniques are obviously also applicable to 18 and 19.

In order to be able to simulate two antenna beams the axes of which are shifted with respect to each other, the echo azimuth pulses supplied by the circuit 14 are delayed in a circuit 20 by an amount of time proportional to the angular difference between the two axes before being applied to the sampling circuit 6.

Figure 4A:
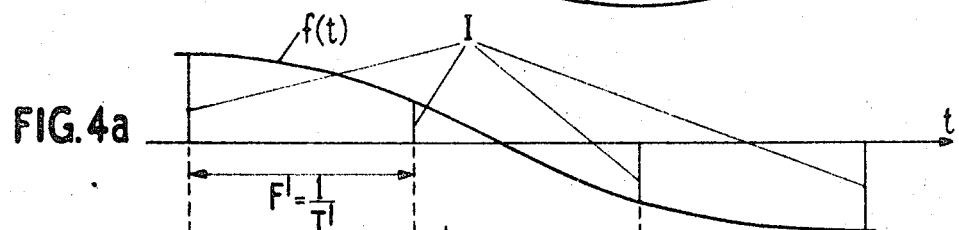
FIGS. 4a, 4b, 4c, and 4d depict typical waveforms at various points in the block diagram of FIG. 2.
Figure 4B:
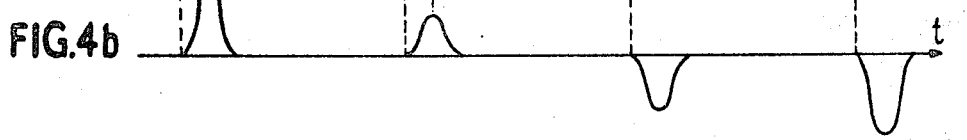
Figure 4C:
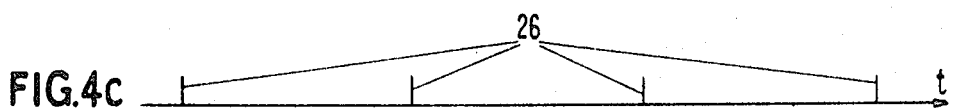
Figure 4D:
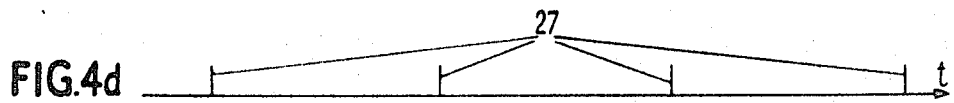

The operation of the circuit of FIG. 2 will be described functionally and mathematically assuming that the antenna is fixed and that the azimuth of the echo changes in a direction such that it intersects the antenna beam which would first pass over the target if the antenna were rotating in a predetermined direction. As shown on FIG. 4a, the sinusoidal signal $f(t)$ supplied by the circuit 1 is sampled by pulses having the frequency of the pulses of the radar which is to be simulated, (i.e. F' = 1/T). At the output of the filter 3, (having a G [ $(k-1)t$] impulse response), the function has the shape of the antenna beam of equation G(t) which would result from antenna illumination by a single primary source. This antenna beam shape is illustrated by FIG. 4b. The output signals of the filter 3 are sampled in the circuits 5 and 6 by pulse trains 26 and 27 (FIGS. 4c and 4d) the phase of which varies since the echo has been assumed to be moving in azimuth. The pulse train 26 is supplied directly by the circuit 14 and would correspond to the first antenna beam to pass over the target for a given direction of rotation of the antenna. The pulse train 27 is identical to the pulse train 26 but is delayed by the circuit 14 and corresponds to the second antenna beam passing over the target. It should be pointed out that, for the same azimuth of the antenna and of an antenna beam, the pulses characterizing the antenna direction (pulses I of FIG. 4c or 4d) do not correspond. These latter pulses (FIG. 4d) are delayed by an amount of time equal to the response time $t_a$ (FIG. 4b) of the filter 3 of FIG. 2. The signals resulting from these samplings are applied respectively to the identical low-pass filters 7 and 8, the cut-off frequency of which is F'/2, in such a way as to detect the envelope of the samples.

The output signals of the filters 7 and 8 are sampled in the circuits 9 and 10 by pulses of frequency F' and of duration equal to the transmitted pulses of the radar to be simulated. These pulses would correspond to the pulses which trigger the sweep of the PPI at the operator console P, except delayed by an amount of time $t_R$ corresponding to the range R of the echo. These discrete range pulses are supplied by the circuit 13 which receives the sine wave signal on 23, and delays it by a value $t_R$ adjustable either manually in a circuit 28 or automatically in a circuit 21. The signals resulting from these sampling operations are applied afterwards to the circuits 11 and 12 (via 9 and 10) to carry out respectively the sum and the difference of the amplitudes as heretofore indicated.

It is easily seen that the description of the operation applies equally well when the antenna rotates, since this is equivalent to having a sampling I (FIG. 4a), the pulses of which have a phase or time of occurrence which varies at the rate of rotation of the antenna.

For explanation purposes, we have taken into account the direction of rotation of the antenna; however, it is to be understood that in actual operation the antenna direction of rotation has no significance if the lobes of the antenna are symmetrical, since the sum and the difference of the output signals of the two channels are simultaneously generated and their ratio is determined subsequently.

The circuit of FIG. 2 enables the simulation of one single echo. To simulate additional echos at the same azimuth, it is sufficient to make provision in circuit 13 to supply several pulses during the course of each period T', each such pulse corresponding to one echo. In order to simulate a plurality of echoes at different azimuths, it is sufficient to make provision for duplicate assemblies comprising the circuits 14, 18, 19, and 20 of FIG. 2.

While the principles of the above invention have been described in connection with specific embodiments and particular extensions of that apparatus, it is to be clearly understood that this description and these drawings are illustrative only and not intended as a limitation of the scope of the invention. Other modifications falling within the scope of the invention will suggest themselves to those skilled in this art.

What is claimed is:

1. A system for simulating the received echo signals of a coherent pulse Doppler radar having a pulse repetition frequency and transmitted pulse duration, $F'$ and $t_d$ respectively, comprising:

a low frequency generator providing a substantially sinusoidal first signal representative of a Doppler frequency from said radar;

means for continuously sampling said first signal by a train of first pulses at the said radar repetition frequency to produce a plurality of first samples;

antenna simulating means, including circuits to vary the phase of said first pulses as a function of bearing of a simulated azimuth scanning antenna;

first filter means responsive to the samples corresponding to said first pulses, said filter means having an impulse response in the shape of the simulated beam pattern of said scanning antenna, thereby to produce a second signal as a series of impulses of polarity and amplitude corresponding to said first samples;

means for azimuth sampling said second signal by a train of pulses at $F'$ and a phase corresponding to the azimuth of the corresponding simulated echo to produce a bearing selected signal;

low-pass filter means responsive to said bearing selected signal;

and range gating means for sampling said bearing selected signal by pulses of $F'$ frequency recurring at a time corresponding to the range of said simulated echo, to produce a simulated video signal of selectable range and bearing having Doppler signal characteristics.

2. The invention set forth in claim 1 further defined in that there is provided a duplicate channel of circuits following said first filter means, and additional means are provided to delay said azimuth sampling of said second signal by delaying said train of pulses applied in said duplicate channel, thereby to provide two of said simulated video signals for each period of simulated scan to simulate the performance of a simultaneous lobing antenna system.

3. The invention set forth in claim 1, further defined in that said low-pass filter has a cut-off frequency of substantially $F'/2$.

4. The invention set forth in claim 2 further defined in that said sampling pulses of $F'$ frequency are also substantially of $t_d$ duration.

5. The invention defined in claim 1 in which said antenna simulating means comprises means for continuously varying said phase of said first pulses to simulate continuous antenna scanning motion.

6. The invention set forth in claim 3 in which the frequency of said first signal, the rate of variation of the phase of said first pulses, the phase of the sampling pulses of said azimuth sampling means, and the range of said sampling pulses in said range gating means are controllable to simulate realistic movement of and other characteristics of said simulated echo.

* * * * *